A. Eames,
Fly Trap,

№ 25,961.  Patented Nov. 1, 1859.

Witnesses:
Lovett Eames
Amelia Kingsley

Inventor,
Aaron Eames

UNITED STATES PATENT OFFICE.

AARON EAMES, OF KALAMAZOO, MICHIGAN.

FLY-TRAP.

Specification of Letters Patent No. 25,961, dated November 1, 1859.

*To all whom it may concern:*

Be it known that I, AARON EAMES, of Kalamazoo, in the county of Kalamazoo and State of Michigan, have invented a new and Improved Fly-Trap; and I do hereby declare that the following is a full, clear, and exact description of the same, reference being had to the annexed drawing, making a part of this specification, in which—

Figure 1:
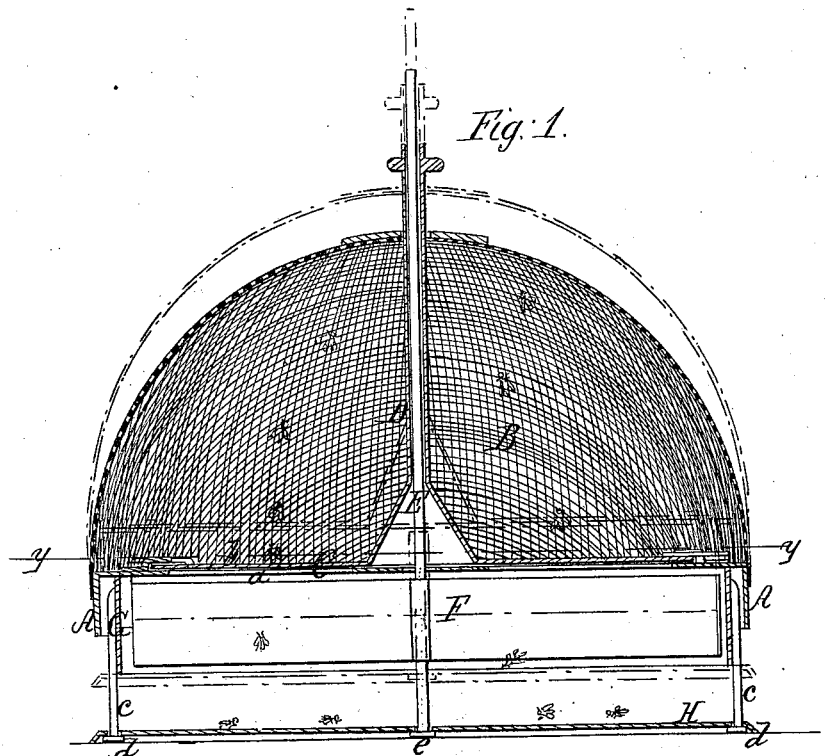
Figure 2:
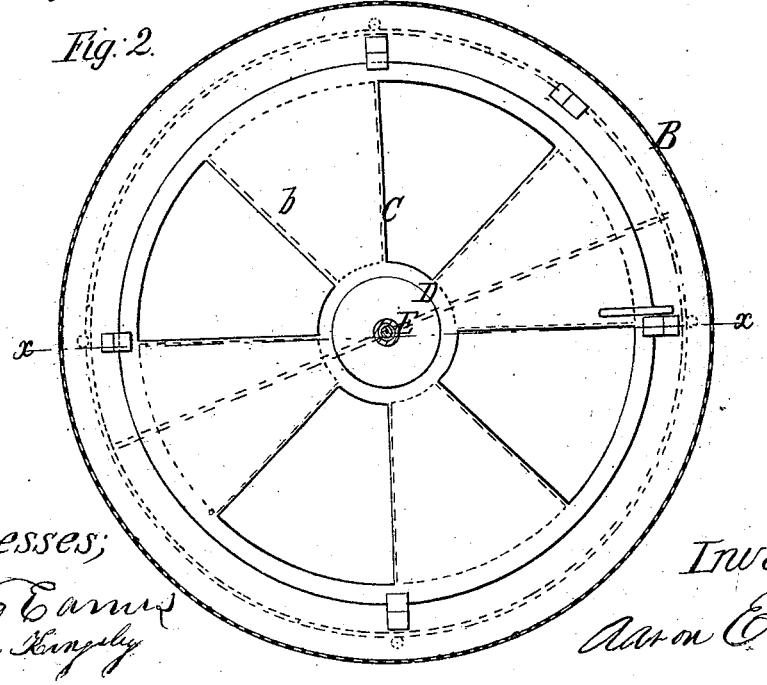

Figure 1, is a vertical section of my invention taken in the line $x$, $x$ Fig. 2, Fig. 2, a horizontal section of ditto, taken in the line $y$, $y$, Fig. 1.

Similar letters of reference indicate corresponding parts in the two figures.

This invention consists in the employment or use of a wire-cloth fly-receptacle, register, bait-board, annular gate and rotating clearer, arranged substantially as hereinafter described, whereby an extremely simple and efficient article is obtained for the intended purpose.

To enable those skilled in the art to fully understand, construct and use my invention, I will proceed to describe its construction, and the way in which it is operated.

A, represents a rim which transversely is of annular form as shown clearly in Fig. 1. This rim may be of sheet metal and it is attached to the lower end of a dome-shaped wire-cloth receptacle B, which serves as a prison for the flies.

At the bottom or lower part of the receptacle B, and connected with the rim A, a radially slotted plate $b$, is placed and allowed to turn a certain distance. The two plates $a$, $b$, form a register C.

The upper plate $b$, of the register has a vertical tube D, attached centrally to it. This tube D, extends up through the apex of the receptacle B, and is allowed to turn in the receptacle. Within the tube D, a rod E, is fitted loosely. This rod E, extends up above the tube D, and also extends below it and is attached at its lower end to the center of a plate F, which forms two fans or beaters just below the register C.

Below the rim A, an annular plate or rim G, is placed. To this plate or rim G, rods or standards $c$, are attached at equal distances apart, said standards passing through a circular plate H, which serves as a feed board. The lower ends of the standards $c$, are provided with heads $d$, and the lower end of rod E, which also passes through the plate H, and at its center is provided with a head $e$, as shown clearly in Fig. 1.

The operation is as follows: The feed or bait-board H, is supplied with any suitable sweet substance or other material that will attract flies and the device is set on a table or other convenient place. The receptacle B, will by its own gravity rest on the gate G, the latter being supported by the rods $c$. The register C, is closed. It will be seen by referring to Fig. 1, that when the implement is thus placed there will be a space between the gate G, and the bait-board H, for the flies to pass on the latter and when a sufficient quantity have collected on the bait-board the rod E, is raised by the attendant and in consequence of the head $e$, at the lower end of rod E, the bait-board H, will be raised, the bait-board coming in contact with the bottom of gate G, and the flies will be inclosed, the gate G, performing its proper function. The attendant then opens the register C, by turning tube D, and turns the rod E, so that the plate F, will rotate and sweep the flies off from the bait-board, the flies passing into the receptacle B. When all the flies are within the receptacle, the attendant closes the register and releases rod E, and the parts will return to their original position, the operation above described being repeated when the bait-board is again covered with flies.

This invention is extremely simple and far more economical and efficient than those having mechanical attachments, the latter not only being liable to get out of repair, but expensive to repair when necessary.

Having thus described my invention, what I claim as new and desire to secure by Letters Patent, is—

The combination of the fly-receptacle B, register C, rotating clearer F, bait board H, and gate G, arranged substantially, as and for the purpose set forth.

AARON EAMES.

Witnesses:
LOVITT EAMES,
AMELIA KINGSLEY.